US006483593B1

(12) United States Patent
Bell et al.

(10) Patent No.: US 6,483,593 B1
(45) Date of Patent: Nov. 19, 2002

(54) HETRODYNE INTERFEROMETER AND ASSOCIATED INTERFEROMETRIC METHOD

(75) Inventors: John A. Bell, Issaquah, WA (US); Barbara A. Capron, Issaquah, WA (US); David A. Leep, Des Moines, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/371,207

(22) Filed: Aug. 10, 1999

(51) Int. Cl.[7] .................................................. G01B 9/02
(52) U.S. Cl. ........................ 356/487; 356/493; 356/498
(58) Field of Search ................................. 356/484, 485, 356/486, 487, 489, 490, 491, 492, 493, 495, 450

(56) References Cited

U.S. PATENT DOCUMENTS

| 3,458,259 A | 7/1969 | Bagley et al. |
| 3,572,937 A | 3/1971 | Baldwin |

(List continued on next page.)

FOREIGN PATENT DOCUMENTS

| DE | 39 37 268 A1 | 5/1991 |
| JP | 01-012203 | 1/1989 |
| SU | 1158860 | 5/1985 |

OTHER PUBLICATIONS

Steinmetz, et al.,*Accuracy Analysis And Improvements To The Hewlett–Packard Laser Interferometer System*, SPIE, vol. 816 Interferometric Metrology (1987), pp. 79–94.

Tanaka, et al., *Linear Interpolation Of Periodic Error In A Heterodyne Laser Interferometer AtSubnanometer Levels*, IEEE Transactions On Instrumentation And Measurement, vol. 33, No. 2, Apr. 1989, pp. 552–554.

(List continued on next page.)

Primary Examiner—Frank G. Font
Assistant Examiner—Andrew H Lee
(74) Attorney, Agent, or Firm—Alston & Bird LLP

(57) ABSTRACT

A heterodyne interferometer and an associated interferometric method are provided that significantly reduce polarization crosstalk and that permit the target to translate to a limited extent in a direction orthogonal to the direction of interest and to be tilted to a limited extent without adversely affecting the resulting measurement. The heterodyne interferometer includes a beamsplitter for splitting each of a first beam and a coherent second beam into at least two partial beams. Advantageously, the first beam and the partial first beams propagate in a first plane, while the second beam and the partial second beams propagate in a second plane that is offset from the first plane by at least two beam diameters so as not to spatially overlap with the first beam and the partial first beams, thereby preventing polarization crosstalk. The heterodyne interferometer also includes a reference arm and a measurement arm that each receive a partial first beam and a partial second beam. The measurement arm can include a pair of crossed porro prisms with at least one of the porro prisms being adapted to move in conjunction with the target. By utilizing the pair of crossed porro prisms, the target can translate to a limited extent in a direction orthogonal to the measurement path and can be tilted to a limited extent without adversely affecting the resulting measurements. The heterodyne interferometer can also include at least one and, more commonly, a pair of detectors for receiving partial beams that have traversed the reference arm and the measurement arm. Based upon the resulting interference fringes, the detector can provide a signal indicative of the target displacement.

22 Claims, 3 Drawing Sheets

U.S. PATENT DOCUMENTS

| | | | |
|---|---|---|---|
| 3,881,823 A | | 5/1975 | De Lang et al. |
| 3,958,884 A | | 5/1976 | Smith |
| 4,167,336 A | | 9/1979 | Ljung |
| 4,295,741 A | | 10/1981 | Palma et al. |
| 4,426,155 A | | 1/1984 | Monchalin |
| 4,693,605 A | | 9/1987 | Sommargren |
| 4,802,764 A | | 2/1989 | Young et al. |
| 4,907,886 A | | 3/1990 | Dandliker |
| 4,912,530 A | * | 3/1990 | Bessho ............... 356/487 |
| 4,958,929 A | | 9/1990 | Kondo |
| 5,274,436 A | | 12/1993 | Chaney |
| 5,543,833 A | | 8/1996 | Toyoda et al. |
| 5,675,412 A | | 10/1997 | Solomon |
| 5,784,161 A | | 7/1998 | Bechstein et al. |
| 6,208,424 B1 | * | 3/2001 | de Groot ............... 356/486 |

OTHER PUBLICATIONS

Hou, et al., *Investigation And Compensation Of The Nonlinearity Of Heterodyne Interferometers, Precision Engineering*, vol. 14, No. 2, Apr. 1992, pp. 91–98.

Bobroff, *Recent Advances in Displacement MeasuringInterferometry, Meas. Sci. Technol.* 4, 1993, pp. 907–926.

Stone, et al., *Wavelength–Shift Interferometry: Using A Dither To Improve Accuracy, American Society For Precision Engineering*, Proceeding vol. 14, 1996, pp. 357–362.

Brochure, Hewlett Packard, *Choose From A Large Selection Of Optical Components For System Design Flexibility—Product Overview—Optics And Laser Heads For Laser–Interferometer Positioning System* Copyright 1995.

Wu, et al., *Heterodyne Interferometer With Subatomic PeriodicNonlinearity, Applied Optics*, vol. 38, No. 19, Jul. 1, 1999, pp. 4089–4094.

\* cited by examiner

HETERODYNE INTERFEROMETER AND ASSOCIATED INTERFEROMETRIC METHOD

FIELD OF THE INVENTION

The present invention relates generally to methods and apparatus for determining the displacement or location of a target and, more particularly, to heterodyne interferometers and associated interferometric methods.

BACKGROUND OF THE INVENTION

Heterodyne interferometers are utilized in a variety of commercial and noncommercial applications. For example, optical heterodyne interferometers commonly measure displacement or are used in sensors to measure force, pressure or other physical quantities that create a measurable displacement in a respective transducer.

Heterodyne interferometers include a stable optical source, such as a laser, for providing coherent optical signals. The optical source can provide signals directly to the system or the optical source can be remotely located and connected to the system via optical fibers. Regardless of the location of the optical source, conventional heterodyne interferometers require coherent signals having two different frequencies. In addition, most conventional heterodyne interferometers require that the signals having the first frequency be orthogonally polarized relative to the signals having the second frequency. These heterodyne interferometers are therefore classified as polarizing interferometers. For example, the Hewlett Packard 10715 differential interferometer is a type of polarizing heterodyne interferometer as described in an article by C. Steinmetz, et al., entitled Accuracy Analysis and Improvements to the Hewlett-Packard Laser Interferometer System, SPIE 816, Interferometric Metrology, p. 79 (1987). Similarly, the Hewlett Packard 5527 Laser Position Transducer System is another type of polarizing heterodyne interferometer as described in HP product brochure No. 5964-6190 E entitled Optics and Laser Heads for Laser-Interferometer Positioning Systems (1995).

More specifically, conventional polarizing interferometers include a first laser source for providing a first beam having a first frequency and a first linear polarization and a second laser source having a second frequency and a second linear polarization that is orthogonal to the first polarization state. A polarizing interferometer also includes reference and measurement arms as well as a polarizing beamsplitter for separating the first and second beams based upon their polarization such that one of the beams is directed to the measurement arm of the interferometer, while the other beam is directed to the reference arm of the interferometer. Upon returning from the measurement and reference arms, the first and second beams are mixed by a polarization analyzer or other polarization manipulating optical elements so as to create an interference pattern. While the reference arm typically has a fixed or predetermined length, the measurement arm has a length that is defined by the position of a target. As such, as the target is displaced, the optical length of the measurement arm is accordingly altered. By measuring the phase of the resulting fringes created by the interference of the first and second beams, however, the heterodyne interferometer permits the displacement of the target to be determined.

Unfortunately, the first and second beams that are produced by the laser sources generally do not have pure linear polarization. Thus, the first beam that is substantially polarized with the electric field parallel to the plane of incidence of the interferometer beamsplitter, P-polarized, also generally has some component of electric field perpendicular to the plane of incidence, S-polarized. Likewise, the second beam that is primarily S-polarized, also generally has some P-polarization. In addition, polarizing beamsplitters are not perfect and therefore do not completely separate signals that are orthogonally polarized. See N. Bobroff, "Recent Advances in Displacement Measuring Interferometry", Meas. Sci. Tech. Vol. 4, pp. 907–26 (1993). As such, while a polarizing beamsplitter generally separates the beams according to their polarization state such that S-polarized signals are directed along one path and P-polarized signals are directed along another path, imperfections in conventional polarizing beamsplitters allow at least some P-polarized signals to mix with the generally S-polarized beam and, correspondingly, permit at least some S-polarized signals to mix with the generally P-polarized beam.

The mixture of the polarization states downstream of the polarizing beamsplitter is commonly termed "polarization crosstalk". As a result of polarization crosstalk, conventional polarizing interferometers having a nonlinear error in the final phase measurement. The error is periodic with the period of one wavelength of the optical path change. Since the phases of the beams that give rise to this nonlinear error can drift, the magnitude of the error can also vary over time. In order to minimize the variations in the magnitude of the nonlinear error, some polarizing interferometers rapidly dither the reference mirror that defines the optical length of the reference arm so as to average out the periodic error. While generally effective, this technique requires the interferometer to be substantially more complex.

In addition, U.S. Pat. No. 4,693,605 to Gary E. Sommargren describes an interferometer in which mixing of the different polarization states is minimized by reducing the number of reflections in the interferometric system. While somewhat helpful, this technique appears only to reduce, but not totally solve the problems created by polarization crosstalk. In addition, an article by W. Hou, et al. entitled "Investigation and Compensation of the Nonlinearity of Heterodyne Interferometers", Precision Engineering, Vol. 12, p. 91 (1992), describes a technique for compensating for some of the nonlinear errors in the final phase measurement. While also somewhat beneficial for reducing the nonlinear errors, this technique does not compensate for all nonlinear errors and is more complex by requiring twice the usual number of photodetectors and phase-measurement channels. As such, while several techniques have been developed for reducing the polarization crosstalk of heterodyne interferometers, these techniques do not eliminate the polarization crosstalk and typically increase the complexity of the interferometric system.

Nonpolarizing heterodyne interferometers have also been developed. By avoiding the mixing of beams of different polarization states, nonpolarizing interferometers reduce or eliminate the nonlinear errors in the final phase measurement that otherwise arise as a result of polarization crosstalk. See, for example, M. Tanaka, et al. "Linear Interpolation of Periodic Error in a Heterodyne Laser Interferometer at Subnanometer Levels", IEEE Trans. Instrum. Meas., Vol. 38, No. 2, pp. 552–54 (April 1989); Jack A. Stone, et al., "Wavelength Shift Interferometry: Using a Dither to Improve Accuracy", Proc. of the Eleventh Annual Meeting of the American Society for Precision Engineering," pp. 357–62 (Nov. 9–14, 1996); and Chien-ming Wu, et al., "Heterodyne Interferometer with Subatomic Periodic Nonlinearity," Applied Optics, Vol. 38, pp. 4089–94 (1999). Unfortunately, conventional nonpolarizing interferometers suffer from several disadvantages including increased complexity created by additional optical components that must remain accurately aligned.

In addition to problems related to polarization crosstalk, conventional heterodyne interferometers are typically limited by the requirement that the target move only in a predetermined direction of interest that the interferometer is designed to measure. As such, motion of the target in a plane orthogonal to the direction of interest typically interferes with the measurement and should be avoided. In addition, tilting of the target or the stage on which the target is mounted can adversely influence the measurement. Accordingly, conventional heterodyne interferometers generally limit the target to movement in the direction of interest and do not permit movement in a plane orthogonal to the direction of interest or tilting of the target.

SUMMARY OF THE INVENTION

A heterodyne interferometer and an associated interferometric method are provided to address the limitations of conventional heterodyne interferometers. In particular, the heterodyne interferometer of the present invention is a nonpolarizing interferometer that significantly reduces, if not eliminates, polarization crosstalk without requiring the complexity and alignment accuracy of conventional nonpolarizing interferometers. In addition, the heterodyne interferometer of one advantageous embodiment includes a measurement arm having a pair of crossed porro prisms, one of which serves as the target, and which is permitted to translate within limits set by the optical apertures in directions orthogonal to the measurement axis without adversely affecting the measurement. Similarly, this configuration allows the target porro prism to rotate about the measurement axis or either orthogonal axis within some limited range without adversely affecting the measurement. The allowable tilt range is dependent on factors such as displacement measurement tolerance, beam diameter, and design dimensions, but can be of sufficient extent as to be a determining factor in selecting this approach over conventional methods.

According to the present invention, the heterodyne interferometer includes a beamsplitter for splitting each of a first beam and a coherent second beam into at least two partial beams. In instances in which the first and second beams have the same polarization, the beamsplitter is a nonpolarizing beamsplitter. However, in instances in which the first and second beams are orthogonally polarized, the beamsplitter is a polarizing beamsplitter. Typically, the first beam and the partial first beams have a first frequency, while the second beam and the partial second beams have a second frequency. While the first and second beams can be provided in different manners, the first and second coherent beams are typically provided by a two-frequency laser or by a single-frequency laser plus frequency shifting devices.

The heterodyne interferometer also includes a reference arm and a measurement arm, downstream of the beamsplitter. The beamsplitter therefore directs a partial first beam and a partial second beam to the reference arm so as to propagate along a reference path of a predetermined length. Likewise, the beamsplitter directs another partial first beam and another partial second beam to the measurement arm so as to propagate along a measurement path. In this regard, the length of the measurement path is at least partially defined by the position of a target.

According to one advantageous aspect of the present invention, the first beam and the partial first beams propagate in a first plane, while the second beam and the partial second beams propagate in a second plane that is offset from the first plane. The first beam and the partial first beams therefore propagate in a downstream direction without spatially overlapping with the second beam and the partial second beams until transit through the measurement and reference arms is completed. As such, the polarization states of the first beam and the partial first beams and the second beam and the partial second beams do not have an opportunity to mix and, as a result, polarization crosstalk is avoided. While the first and second planes can be offset by a variety of distances sufficient to prevent spatial overlap, the first and second planes are preferably offset by at least two beam diameters.

The heterodyne interferometer can also include at least one detector downstream of the reference and measurement arms. The detector receives a partial first beam that has traversed either the reference arm or the measurement arm as well as a partial second beam that has traversed the other of the reference arm and the measurement arm. Based upon the interference fringes created by mixing the partial first beam and the partial second beam, the detector can provide a signal indicative of the displacement of the target. More typically, the heterodyne interferometer includes first and second detectors. In this embodiment, each of the detectors receives a partial first beam that has traversed one of the reference arm and a measurement arm as well as a partial second beam that has traversed the other of the reference arm and the measurement arm. Based upon the output of the first and second detectors, the displacement of the target can be accurately determined. An important practical consideration is that the measurement of the phase difference from the two detector configuration is insensitive to common mode phase shifts that result from phase variations in the delivery of the signal sources to the interferometer. Such variations can be especially significant when optical fibers are used to deliver light from the laser sources to the interferometer. If only one detector is used, the detected interference signal phase resulting from target motion is indistinguishable from either thermal or strain induced optical path length variations in the delivery optical fibers. By using two detectors, together with electronics that measure the difference of the interference signal phase from each, any phase variations that occur prior to the interferometer beamsplitter are cancelled. Thus, this phase difference measurement is sensitive only to differential optical path length variations between the measurement and reference arms. As such, the heterodyne interferometer can accurately measure the displacement of a transducer designed to measure force, pressure or other physical quantities without being adversely affected by nonlinear errors arising from polarization crosstalk.

According to one advantageous embodiment, the heterodyne interferometer has a measurement arm that includes a pair of crossed porro prisms. In this regard, at least one of the porro prisms is adapted to move in conjunction with the target to thereby at least partially define the length of the measurement path. By utilizing the pair of crossed porro prisms, the heterodyne interferometer of this advantageous embodiment permits the target to translate to a limited extent in a direction orthogonal to the measurement path without adversely affecting the measurements obtained by the heterodyne interferometer. In addition, the pair of crossed porro prisms permits the target to be tilted to a limited extent without adversely affecting the measurements provided by the heterodyne interferometer. Thus, the heterodyne interferometer of this advantageous embodiment is relatively immune to movement of the target in directions other than the direction of interest in order to further improve the reliability of the measurements obtained by the heterodyne interferometer and associated interferometric method of the present invention.

DETAILED DESCRIPTION OF THE INVENTION

The present invention now will be described more filly hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will filly convey the scope of the invention to those skilled in the art. Like numbers refer to like elements throughout.

Figure 1:
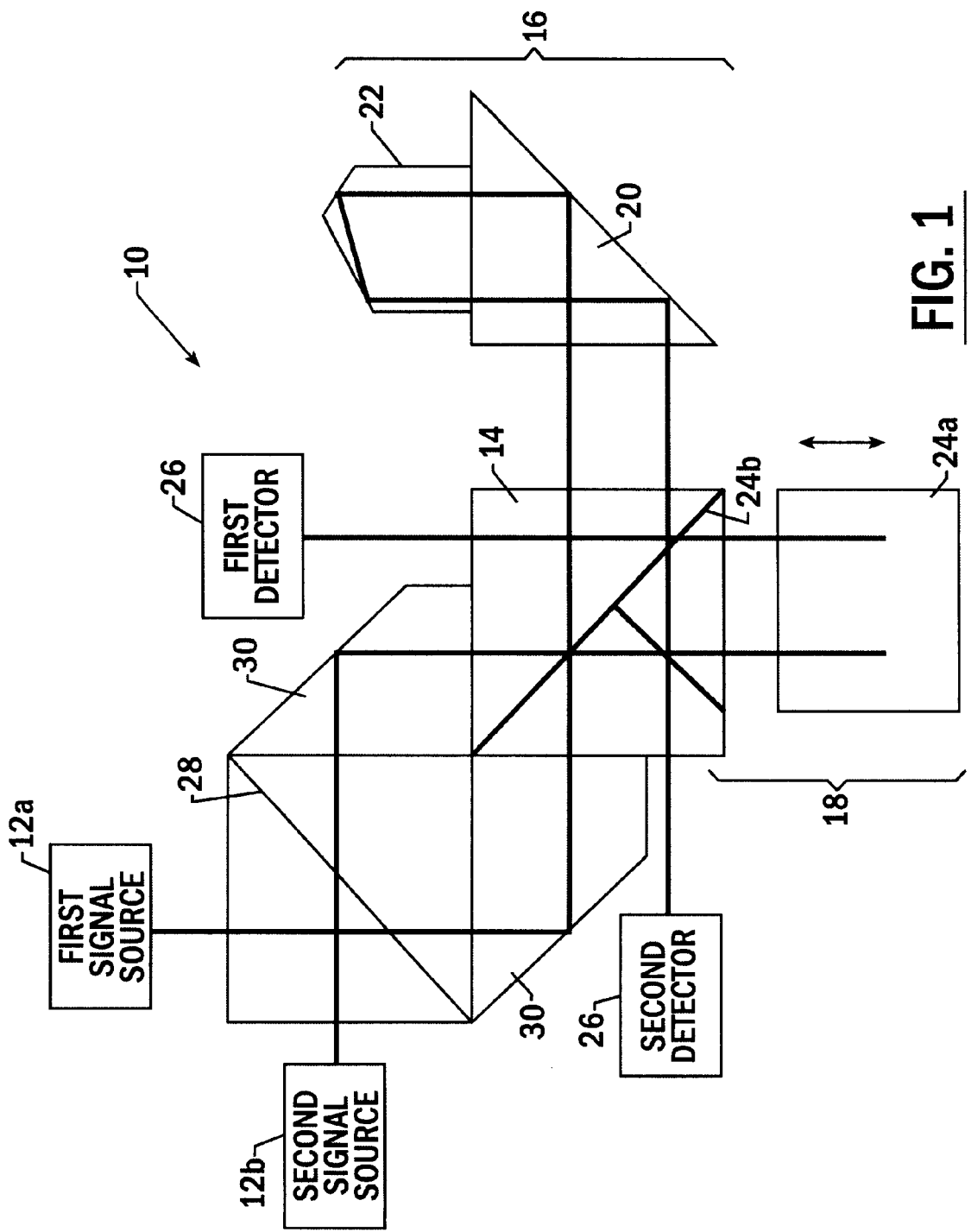
FIG. 1 is a top plan view of a heterodyne interferometer according to one embodiment to the present invention.

A heterodyne interferometer 10 according to one advantageous embodiment of the present invention is depicted in FIG. 1. As depicted in FIG. 1 the heterodyne interferometer can be a nonpolarizing interferometer. However, as described subsequently in conjunction with the embodiment of FIG. 4, the heterodyne interferometer can be a polarizing interferometer, if so desired.

The heterodyne interferometer 10 includes at least one signal source for providing first and second beams of coherent signals. As shown in FIG. 1, the heterodyne interferometer can include a first signal source 12a, such as a first laser, for providing a first beam and a second signal source 12b, such as a second laser, for providing a coherent second beam. The first and second signal sources provide signals having first and second frequencies, respectively. Alternatively, the first and second beams can be generated by a two-frequency laser or by a single-frequency laser and frequency shifting devices. For example, a single-frequency diode-pumped YAG laser can deliver signals having a wavelength of 1.3 microns to an acousto-optic modulator. The acousto-optic modulator is electrically driven to impart frequency shifts of 26.60 MHz and 28.4075 MHz to the input signal in order to create the first and second signals. These frequency shifts were suitable in one embodiment since the frequency of the resulting interference signal, as described below, was 1.8075 MHz with stationary conditions which was large enough to accommodate the extremes of target velocity of the particular embodiment. According to the embodiment illustrated in FIG. 1, in which the heterodyne interferometer is a nonpolarizing type of interferometer, however, the first and second signals preferably have the same polarization state.

The heterodyne interferometer 10 also includes a beamsplitter 14 for splitting the first and second beams into first and second partial beams. In the embodiment illustrated in FIG. 1 in which the first and second beams have the same polarization, the beamsplitter is a nonpolarizing beamsplitter. As described below in conjunction with the embodiment of FIG. 4, however, the beamsplitter may be a polarizing beamsplitter in instances in which the first and second beams are orthogonally polarized.

The first and second signal sources 12a and 12b can be positioned near the beamsplitter 14 such that the first and second beams are immediately incident upon the beamsplitter. Alternatively, the first and second signal sources can be remote from the beamsplitter. In this embodiment, the first and second beams can be delivered to the beamsplitter by means of respective optical fibers. Preferably, the optical fibers of this embodiment are polarization maintaining optical fibers such that the first and second beams remain in the same polarization state.

The beamsplitter 14 splits each of the first beam and the second beam into at least two partial beams. Although the beams can be split in different manners without departing from the spirit and scope of the present invention, each partial beam typically has a substantially equal portion of the energy of the original beam. As a result of splitting the first and second beams, each partial first beam has the same frequency and the same polarization state as the original first beam, while each partial second beam has the same frequency and the same polarization state as the original second beam.

The heterodyne interferometer 10 of the present invention also includes a reference arm 16 and a measurement arm 18, downstream of the beamsplitter 14. The reference arm defines a reference path of a predetermined length. Likewise, the measurement arm defines a measurement path. However, the length of the measurement path is at least partially defined by the position of a target that is adapted to move in a predetermined direction of interest in order to either lengthen or shorten the measurement path. With respect to FIG. 1, for example, the predetermined direction of interest is indicated by the double-headed arrow. As described below, by analyzing the beams that return from the reference and measurement arms, the heterodyne interferometer of the present invention can provide a measurement of the displacement of the target that is useful in many applications.

Figure 2A:
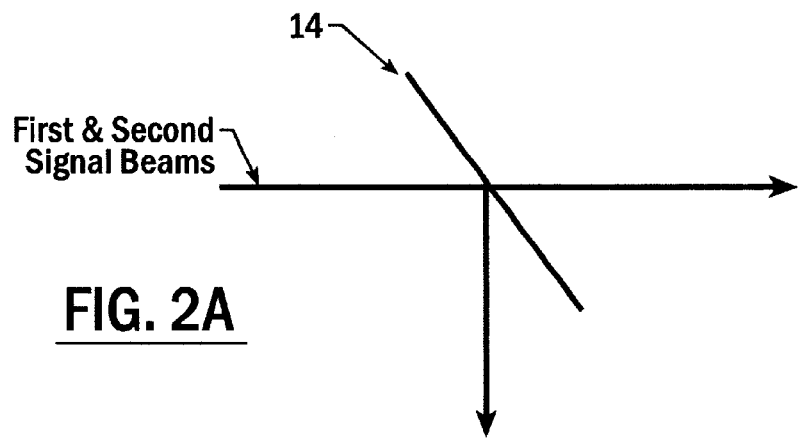
FIGS. 2A and 2B are schematic top and side views, respectively, of the beamsplitter illustrating the offset between the first and second beams.
Figure 2B:
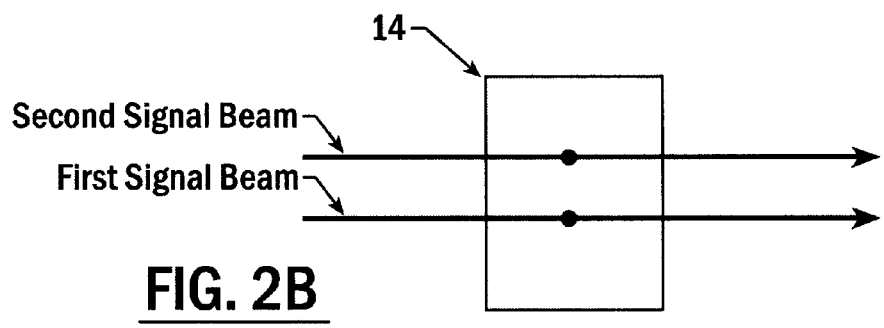

According to the present invention, the first beam and the partial first beams created by the beamsplitter 14 propagate in a first plane. Likewise, the second beam and the partial second beams created by the beamsplitter propagate in a second plane, offset from the first plane. For example, FIG. 2A is a schematic top view of a beamsplitter that shows the splitting of each of the first and second beams into partial first and second beams, while FIG. 2B is a schematic side view of the beamsplitter that shows the first and second beams and their respective partial beams being disposed in first and second planes, respectively. While the first and second planes can be offset at different manners, the first and second beams are preferably offset by a distance sufficient to prevent any spatial overlap between the first and second beams at any point upstream of the end of the reference and measurement arms. In this regard, the first and second planes are typically offset by at least two beam diameters, although the first and second planes can be offset by different amounts without departing from the spirit and scope of the present invention. In one advantageous embodiment, for example, the separation between the first and second planes was 4.6 mm, corresponding to 3.5 beam diameters. However, smaller separations, down to about 2 beam diameters, are expected to have small enough crosstalk for typical application requirements and for Gaussian mode field distribution laser beams.

By being spaced apart in different planes, the first beam and the partial first beams do not mix with the second beam and the partial second beams until the partial first beams and the partial second beams have propagated through the reference arm 16 and the measurement arm 18, thereby avoiding polarization mixing and greatly reducing, if not eliminating, undesirable crosstalk effects. As a result, the resulting measurements obtained by the heterodyne interferometer 10 and associated interferemetic method of the present invention are extremely accurate and do not suffer from the nonlinear errors.

The reference arm 16 can be constructed in a number of different manners, but typically includes means for receiving a partial beam propagating in one of the planes and for reflecting the partial beam in the other of the planes. As such, a partial beam that is received in the first plane by the reference arm is reflected in the second plane. Conversely, a partial beam that is received in the second plane by the reference arm is reflected in the first plane. Although the reference arm can include a number of different optical components, the reference arm of one advantageous embodiment includes a right angle prism 20 and a retroreflector 22, as shown in FIG. 1. The prism serves as a turning mirror, while the retroreflector reflects the partial beam in a manner that causes the partial beam that is received in one of the planes to be reflected in the other of the planes. Although the retroreflector is shown somewhat schematically in FIG. 1, a retroreflector is depicted in more detail in conjunction with the embodiment of FIG. 4.

Figure 3:
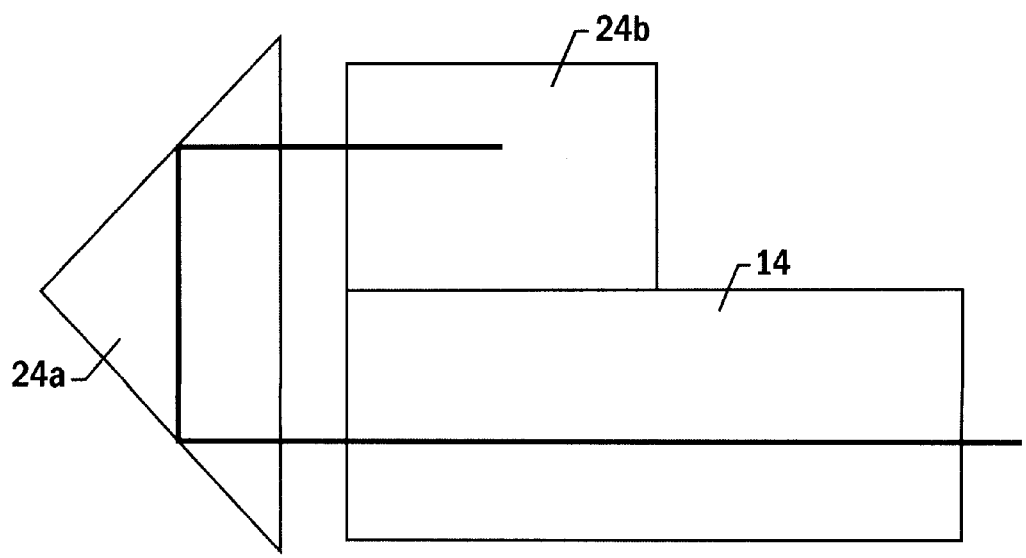
FIG. 3 is a side view of a portion of the heterodyne interferometer of FIG. 1 illustrating the pair of crossed porro prisms in more detail.

As shown in FIG. 1 and, in more detail, in FIG. 3, the measurement arm 18 of one advantageous embodiment preferably includes a pair of crossed porro prisms 24. The crossed porro prisms are a pair of right angle prisms having vertices whose axes are rotated 90° out of plane with respect to one another. See, for example, the depiction of the pair of crossed porro prisms in FIG. 4. One of the porro prisms, such as porro prism 24a in the embodiment of FIGS. 1 and 3, is mounted so as to move in conjunction with the target and, in some instances, may serve as the target itself. While this porro prism can be mounted for movement in a variety of manners, the porro prism is typically mounted upon a stage that moves in conjunction with the target.

Figure 4:
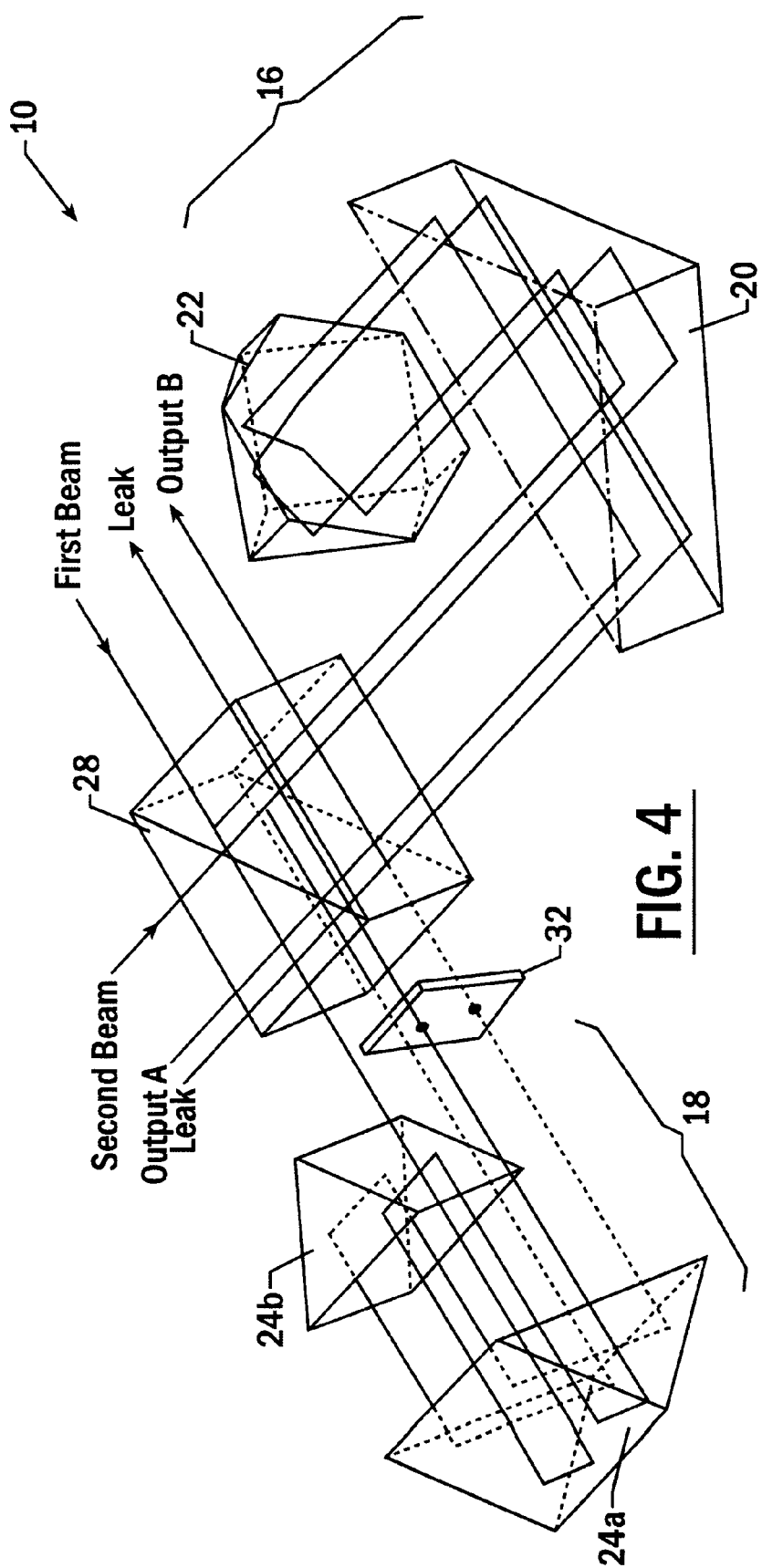
FIG. 4 is a perspective view of a heterodyne interferometer of another embodiment of the present invention.

As depicted in FIG. 3 and, in more detail, in FIG. 4, the pair of crossed porro prisms 24 reflects the beams in the same plane in which the beams are received. For example, a beam that arrives in the first plane is reflected in the first plane, while a beam that arrives in the second plane is reflected in the second plane. By way of explanation, a description of the path of a beam that enters the pair of crossed porro prisms in the first plane will be hereinafter provided with reference to FIG. 3 in which a beam in the first plane will be termed a "low" beam and a beam in the second plane will be termed "high" beam. More particularly, a beam that enters the first porro prism 24a in a low state relative to the beamsplitter 14, i.e., in the first plane, makes two reflections and leaves the first porro prism in a high state relative to the second porro prism 24b. The reflected signal then enters the second porro prism in which it makes two additional reflections and is returned to the first porro prism in the high state relative to the second porro prism. The reflected beam then makes two additional reflections in the first porro prism and is emitted in the low state relative to the beamsplitter, i.e., the same plane in which the signal beam originally entered the pair of crossed porro prisms.

Likewise, a beam that enters the crossed porro prism in a high state, i.e., in the second plane, will be reflected in a similar fashion and will exit the porro prisms in a high state, i.e., in the second plane. By utilizing a pair of crossed porro prisms 24 to define the measurement arm 18, the target is permitted to translate to a limited extent in a plane orthogonal to the predetermined direction of interest and can be tilted to a limited extent without adversely affecting the measurements obtained by the heterodyne interferometer 10 of the present invention. In other words, the heterodyne interferometer of the present invention is insensitive to orthogonal movement of the target or tilting of the target within limited range of movement. In addition, by requiring that the beams pass through the pair of crossed porro prisms twice, the pair of crossed porro prisms doubles the sensitivity of the heterodyne interferometer to displacement of the target in the predetermined direction of interest relative to conventional heterodyne interferometers.

Although the reference arm 16 and the measurement arm 18 are constructed in different manners, the respective glass and air path lengths of the reference arm and the measurement arm are preferably closely matched to minimize distortions caused by temperature variations. In this regard, the reference arm and/or the measurement arm can include one or more additional glass plates to substantially balance the respective glass path lengths of the measurement and reference arms in order to minimize thermal variations therebetween.

The heterodyne interferometer 10 also includes at least one detector 26 and, more particularly, first and second detectors to which the beams are directed by the beamsplitter 14 after returning from the reference and measurement arms 16, 18. While the heterodyne interferometer can include a variety of detectors, the detectors are typically photodiodes. Each of the detectors is adapted to receive a partial first beam that has traversed either the reference arm or the measurement arm as well as a partial second beam that has traversed the other of the reference arm and measurement arm. As described below, the interference of the beams received by the detectors permits the displacement of the target to be accurately measured.

In the illustrated embodiment in which the beamsplitter 14 splits the beams returning from the reference arm 16 and the measurement arm 18 and directs the resulting partial beams to the first and second detectors 26, a number of signals are directed to each detector, but only a pair of signals reach the detector so as to create an interference pattern thereupon. In this regard, the first beam that propagates in the first plane is split into partial first beams that also propagate in the first plane and are directed to the reference and measurement arms. The partial first beam that enters the reference arm in the first plane leaves the reference arm in the second plane and is then again split by the beamsplitter 14 into two partial beams, one of which is directed to the first detector and one of which is directed to the second detector. These partial beams will be referenced as 21R in which the first digit refers to the respective plane (1 for the first plane and 2 for the second plane), the second digit refers to the frequency of the beam (1 for the first frequency and 2 for the second frequency), and the last digit refers to the respective arm through which the partial signal propagated (R for the reference arm and M for the measurement arm). With respect to the partial first beam that is in the first plane and is directed to the measurement arm, the partial first beam returns from the measurement arm in the first plane and is split by the beamsplitter with portions of the partial first beam being directed to both the first and second detectors. These partial beams are referenced as 11M.

Similarly, the second beam that propagates in the second plane is split into partial second beams that also propagate in the second plane and are directed to the reference and measurement arms 16, 18. With respect to the partial second beam that is directed to the reference arm in the second plane, the partial second beam returns from the reference arm in the first plane and is split by the beamsplitter 14, into portions that are directed to the first and second detectors 26. These partial beams are referenced as 12R. Similarly, the partial second beam that is directed to the measurement arm in the second plane is returned in the second plane and is split once again by the beamsplitter prior to being directed to both the first and second detectors. These portions of the partial second beam are referenced as 22M. As such, portions of four partial beams designated 11M, 21R, 22M and 12R are directed to each detector. Thus, a pair of interfering beams in the first plane and a pair of interfering beams in the second plane are directed to each detector.

In order to simplify the signal processing, an aperture is inserted so that only one of the pairs of interfering beams reaches each detector 26. In particular, a different one of the pairs of interfering beams is blocked from each detector such that one detector receives the pair of interfering beams in one plane and the other detector receives the pair of interfering beams in the other plane. In one embodiment, the pair of beams in the first plane are blocked from the first detector such that the first detector detects the interference of the pair of beams in the second plane. Likewise, the pair of beams in the second plane can be blocked from the second detector such that the second detector detects the interference of the pair of beams in the first plane. As will be apparent to those skilled in the art, the interference of these beams at the difference frequency provides a measure of the relative phase and, hence, motion, of the target that defines a portion of the measurement arm. By forming the difference of the phase measurements provided by the first and second detectors, the heterodyne interferometer of the present invention can provide a push-pull signal that defines the displacement of the target. See Norman Bobroff, "Recent Advances in Displacement Measuring Interferometry," Meas. Sci. Technol., Vol. 4, pp. 907–26 (1993). As such, the heterodyne interferometer preferably includes a controller, a processor or the like for analyzing the interference patterns created by the detectors and for accurately determining the displacement of the target.

Since the heterodyne interferometer 10 does not permit the first and second beams to mix or otherwise interfere prior to transiting both the measurement and reference legs, the heterodyne interferometer and associated interferometric method of the present invention significantly reduces, if not eliminates, polarization crosstalk. As a result, the measurement of the target displacement is extremely accurate and does not include nonlinear errors that result from polarization crosstalk. Thus, this form of heterodyne interferometer is particularly well suited for measuring the displacements of transducers that are utilized to measure force, pressure or other physical quantities. For example, it can measure the displacement of a transducer that is positioned in a wind tunnel balance in order to precisely measure the force or pressure to which the transducer is subjected.

Although not necessary for the practice of the present invention, the heterodyne interferometer 10 can also include a polarizing beamsplitter 28 upstream of the nonpolarizing beamsplitter 14. Although both the first beam and the second beam preferably have the same polarization state, the first beam and/or the second beam can include a small percentage of orthogonally polarized light. In order to prevent the orthogonally polarized signals from adversely affecting the resulting measurement, the polarizing beamsplitter reflects the orthogonally polarized light while permitting the correctly polarized signals to pass therethrough. In order to properly direct the first and second beams to the nonpolarizing beamsplitter, the heterodyne interferometer can also include the pair of right angle prisms 30 that serve as turning mirrors as shown in FIG. 1.

As shown in FIG. 1, a number of components of the heterodyne interferometer 10 can be bonded together, such as by means of an optical adhesive. In this regard, the polarizing beamsplitter 28, the first and second right angle prisms 30 and the nonpolarizing beamsplitter 14 can be bonded to one another. In addition, the second porro prism 24b can be mounted upon and bonded to the nonpolarizing beamsplitter as shown in FIGS. 1 and 3. As such, the alignment of the various components is simplified since the components will remain in place relative to one another following their initial attachment.

Although a nonpolarizing type of the heterodyne interferometer 10 as in FIG. 1 that utilizes first and second beams having the same polarization state has been described heretofore, the heterodyne interferometer of another embodiment may be a polarizing type and, as a result, may receive first and second beams having different polarization states. As shown in FIG. 4, for example, the heterodyne interferometer of this embodiment can receive first and second beams, each of which have both S and P polarization states with approximately equal power levels. While signals having both S and P polarization states can be provided in various manners, the first and second beams can be provided via respective polarization maintaining optical fibers that are positioned relative to the polarizing beamsplitter with the axis of the optical fibers defining an angle of approximately 45° relative to the plane of incidence within the polarizing beamsplitter 28. If fibers are thus used to bring light to the interferometer, typically a lens, i.e., a collimater, is used just downstream from the end of each fiber, to collimate the emerging beam, as seen, for example, in U.S. Pat. No. 5,274,436 to Raymond J. Chaney. To ensure stable relative phases between the S and P components, the heterodyne interferometer of this embodiment can include a polarizer disposed between the collimater and the beamsplitter. The polarizer would be oriented with its axis parallel to the nominal axis of the polarization maintaining optical fiber such that the transmitted light is linearly polarized with high purity. Thus, the S and P component beams that are separated by the following polarizing beamsplitter would have a fixed phase relationship that is largely independent of leakage in the non-illuminated mode of the polarization maintaining optical fiber. As described above in conjunction with other embodiments of the heterodyne interferometer, the first and second beams are disposed in first and second planes, respectively, such that the first and second beams do not spatially overlap at any point upstream of the ends of the reference and measurement arms 16, 18.

The beams propagate through the heterodyne interferometer 10 in much the same manner as described above in conjunction with other embodiments of the heterodyne interferometer. For purposes of explanation, however, the path of the first beam that is in the first plane will be hereinafter described. The S polarization mode of the first beam is reflected by the beamsplitter 28 and enters the reference arm 16 from which it returns in the second plane. Thereafter, the beamsplitter again reflects the S polarization mode of the reflected light along the path designated output B. If the beam that returns from the reference arm has any P polarized component, the polarizing beamsplitter passes the P polarized component along the path designated "leak" which is blocked or masked prior to reaching the detector. In contrast, the portion of the first beam that has a P polarization is transmitted through the beamsplitter and traverses the measurement arm 18 so as to return in the first plane. The returning signal then passes through a halfwave plate 32 that converts the returning signal from the P polarization state to the S polarization state prior to being reflected by the polarizing beamsplitter and directed along output A in the first plane. Any portion of the signal returning from the measurement arm that remains in the P polarization state even after passing through the halfwave plate will be transmitted by the polarizing beamsplitter and directed along the path designated "leak" which is blocked or masked prior to reaching the detector. The second beam is provided in the second plane and follows similar paths to those described above in conjunction with the first beam.

Thus, the light directed towards the first detector 26 in output A is a combination of a partial first beam in the S-state that has traversed the measurement arm and a partial second beam in the P-state that has traversed the reference arm. To permit the signals to interfere, the heterodyne interferometer 10 includes a polarization analyzer in output A oriented at 45 degrees to project both the S and P polarization states onto a common polarization mode. Likewise, the light directed towards the second detector in output B is a combination of a partial first beam in the P-state that has traversed the reference arm and a partial beam in the S-state that has traversed the measurement arm. As such, the heterodyne interferometer also includes a polarization analyzer associated with the second detector for projecting the S and P polarizations onto a common polarization mode. As such, each detector detects an interference pattern that is indicative of the displacement of the target. As described above, the heterodyne interferometer also preferably includes a controller, a processor or the like that is operably connected to the detectors for forming the difference of the interference patterns created by the first and second detectors in order to determine the target displacement.

Regardless of the polarization purity of the first and second beams that are provided to the heterodyne interferometer 10, the heterodyne interferometer of the present invention provides an accurate measurement of the target displacement without being subjected to nonlinear errors created by polarization crosstalk. In addition, the heterodyne interferometer is insensitive to translation to a limited extent of the target in the plane orthogonal to the predetermined direction of interest and to tilting of the target within a limited range. As such, the heterodyne interferometer of the present invention can be utilized in a wide variety of applications requiring accurate measurement of the target displacement, such as sensors in which the heterodyne interferometer measures the displacement of a respective transducer that, in turn, measures force, pressure or other physical quantities.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A heterodyne interferometer comprising:

a beamsplitter for splitting each of a first beam and a coherent second beam into at least two partial beams, said first beam and said partial first beams including signals having a first frequency, said second beam and said partial second beams including signals having a second frequency;

a reference arm, downstream of said beamsplitter, for receiving a partial first beam and a partial second beam; and a measurement arm, downstream of said beamsplitter, for receiving another partial first beam and another partial second beam, wherein the length of a signal path defined by said measurement arm is at least partially defined by the position of a target;

wherein the first beam and the partial first beams created by said beamsplitter propagate in a first plane, and wherein the second beam and the partial second beams created by said beamsplitter propagate in a second plane, offset from the first plane, such that the first beam and the partial first beams propagate in a downstream direction without spatially overlapping with the second beam and the partial second beams at any point upstream of respective ends of said reference and measurement arms;

wherein one of said reference arm and said measurement arm is configured to receive a partial beam propagating in one of the first and second planes and to reflect the partial beam in the other of the first and second planes; and wherein the other of said reference arm and said measurement arm is configured to receive a partial beam propagating in one of the first and second planes and to reflect the partial beam in the same plane.

2. A heterodyne interferometer according to claim 1 wherein said reference arm comprises means for receiving a partial beam propagating in one of the first and second planes and for reflecting the partial beam in the other of the first and second planes.

3. A heterodyne interferometer according to claim 1 wherein said measurement arm comprises a pair of crossed porro prisms.

4. A heterodyne interferometer according to claim 1 wherein the first and second beams have a beam diameter, and wherein the first and second planes are offset by at least two beam diameters.

5. A heterodyne interferometer according to claim 1 wherein the first and second beams have the same polarization, and wherein said beamsplitter is a nonpolarizing beamsplitter.

6. A heterodyne interferometer according to claim 1 wherein the first and second beams are orthogonally polarized, and wherein said beamsplitter is a polarizing beamsplitter.

7. A heterodyne interferometer according to claim 1 further comprising at least one detector, downstream of said reference and measurement arms, for receiving a partial first beam that has traversed one of said reference arm and said measurement arm and for receiving a partial second beam that has traversed the other of said reference arm and said measurement arm to thereby permit displacement of the target to be at least partially determined therefrom.

8. A heterodyne interferometer according to claim 7 wherein said at least one detector comprises first and second detectors, each of said first and second detectors adapted to receive a partial first beam that has traversed one of said reference arm and said measurement arm and further adapted to receive a partial second beam that has traversed the other of said reference arm and said measurement arm to thereby permit the displacement of the target to be determined therefrom.

9. The heterodyne interferometer according to claim 8, wherein the first and second detectors each measure a difference in the frequency of the respective partial first and second beams, and wherein the first and second detectors each provide a phase measurement based upon the difference in frequency to thereby permit the displacement of the target to be determined from the difference in the phase measurements.

10. A heterodyne interferometer according to claim 1 further comprising at least one signal source for providing the first and second beams of coherent signals.

11. A heterodyne interferometer comprising:
 a beamsplitter for splitting each of a first beam and a coherent second beam into at least two partial beams, said first beam and said partial first beams including signals having a first frequency, said second beam and said partial second beams including signals having a second frequency;
 a reference arm, downstream of said beamsplitter, for receiving a partial first beam and a partial second beam; and
 a measurement arm, downstream of said beamsplitter, for receiving another partial first beam and another partial second beam, wherein said measurement arm comprises a pair of crossed porro prisms, and wherein at least one of said porro prisms is adapted to move in conjunction with a target to thereby at least partially define the length of a signal path defined by said measurement arm while permitting the target to translate to a limited extent in a direction orthogonal to the signal path, and to tilt to a limited extent about any of three orthogonal axes;
 wherein the first beam and the partial first beams created by said beamsplitter propagate in a first plane, wherein the second beam and the partial second beams created by said beamsplitter propagate in a second plane, offset from the first plane, wherein one of said reference arm and said measurement arm is configured to receive a partial beam propagating in one of the first and second planes and to reflect the partial beam in the other of the first and second planes; and
 wherein the other of said reference arm and said measurement arm is configured to receive a partial beam propagating in one of the first and second planes and to reflect the partial beam in the same plane.

12. A heterodyne interferometer according to claim 11 further comprising at least one detector, downstream of said reference and measurement arms, for receiving a partial first beam that has traversed one of said reference arm and said measurement arm and for receiving a partial second beam that has traversed the other of said reference arm and said measurement arm to thereby permit displacement of the target to be at least partially determined therefrom.

13. A heterodyne interferometer according to claim 12 wherein said at least one detector comprises first and second detectors, each of said first and second detectors adapted to receive a partial first beam that has traversed one of said reference arm and said measurement arm and further adapted to receive a partial second beam that has traversed the other of said reference arm and said measurement arm to thereby permit the displacement of the target to be determined therefrom.

14. The heterodyne interferometer according to claim 13, wherein the first and second detectors each measure a difference in the frequency of the respective partial first and second beams, and wherein the first and second detectors each provide a phase measurement based upon the difference in frequency to thereby permit the displacement of the target to be determined from the difference in the phase measurements.

15. A heterodyne interferometer according to claim 11 further comprising at least one signal source for providing the first and second beams of coherent signals.

16. A heterodyne interferometer according to claim 15 wherein said reference arm comprises means for receiving a partial beam propagating in one of the first and second planes and for reflecting the partial beam in the other of the first and second planes.

17. A heterodyne interferometer according to claim 15 wherein the first and second beams have a beam diameter, and wherein the first and second planes are offset by at least two beam diameters.

18. A heterodyne interferometer according to claim 11 wherein the first and second beams have the same polarization, and wherein said beamsplitter is a nonpolarizing beamsplitter.

19. A heterodyne interferometer according to claim 11 wherein the first and second beams are orthogonally polarized, and wherein said beamsplitter is a polarizing beamsplitter.

20. A method for determining displacement of a target, the method comprising:
 providing first and second beams of coherent signals having first and second frequencies, respectively;
 splitting each of the first and second beams into at least two partial beams that propagate in a downstream direction;
 directing a partial first beam and a partial second beam along a reference path of a predetermined length;
 directing another partial first beam and another partial second beam along a measurement path that is at least partially defined by the position of the target; and
 detecting a partial first beam that has traversed one of said reference path and said measurement path and further detecting a partial second beam that has traversed the other of said reference path and said measurement path to thereby permit displacement of the target to be at least partially determined therefrom,
 wherein the first beam and the partial first beams propagate in a first plane, and wherein the second beam and the partial second beams propagate in a second plane, offset from the first plane, such that the first beam and the partial first beams propagate in the downstream direction without spatially overlapping with the second beam and the partial second beams at any point upstream of respective ends of said reference and measurement paths;
 wherein one of said steps of directing partial first beams and partial second beams along the reference and measurement paths comprises:
  receiving a partial beam propagating in one of the first and second planes; and
  reflecting the partial beam in the other of the first and second planes; and wherein the other of said steps of directing partial first beams and partial second beams along the reference and measurement paths comprises:

receiving a partial beam propagating in one of the first and second planes; and reflecting the partial beam in the same plane.

21. A method according to claim 20 wherein said providing step comprises providing the first and second beams with a respective beam diameter in first and second planes, respectively, that are offset by at least two beam diameters.

22. The method according to claim 20, wherein said detecting step comprises:

measuring a difference in the frequency of the partial first beam and the partial second beam propagating in the first plane and measuring the difference in frequency of the partial first beam and the partial second beam propagating in the second plane;

determining a phase measurement of the beams of each plane based upon the difference in frequency; and determining the displacement of the target from the difference in phase measurements.

* * * * *

UNITED STATES PATENT AND TRADEMARK OFFICE
CERTIFICATE OF CORRECTION

PATENT NO. : 6,483,593 B1
DATED : November 19, 2002
INVENTOR(S) : Bell et al.

It is certified that error appears in the above-identified patent and that said Letters Patent is hereby corrected as shown below:

<u>Title page, Item [54] and Column 1, line 1,</u>
In the title "HETRODYNE" should read -- HETERODYNE --.

Signed and Sealed this

Eighth Day of April, 2003

JAMES E. ROGAN
*Director of the United States Patent and Trademark Office*